United States Patent [19]

Snyder

[11] Patent Number: 4,752,436

[45] Date of Patent: Jun. 21, 1988

[54] NUCLEAR COMPONENT HORIZONTAL SEISMIC RESTRAINT

[75] Inventor: Glenn J. Snyder, Lynchburg, Va.

[73] Assignee: The Babcock & Wilcox Company, New Orleans, La.

[21] Appl. No.: 808,783

[22] Filed: Dec. 13, 1985

[51] Int. Cl.⁴ .................. G12C 9/00; G12C 13/00
[52] U.S. Cl. .................. 376/285; 376/289; 376/293; 52/167
[58] Field of Search ............ 376/293, 294, 295, 285, 376/289, 461, 302–304; 52/167, 224, 249, 267, 480, 483, 573

[56] References Cited

U.S. PATENT DOCUMENTS

| | | | |
|---|---|---|---|
| 3,554,868 | 1/1971 | Thorp, II. | 376/285 |
| 3,720,581 | 3/1973 | Kaser | 376/302 |
| 3,753,853 | 8/1973 | Schabert | 376/287 |
| 3,771,499 | 11/1973 | Marroni, Jr. et al. | 376/285 |
| 3,850,795 | 11/1974 | Thome | 376/302 |
| 3,994,776 | 11/1976 | Keller | 376/289 |
| 4,008,757 | 2/1977 | Weatherford, Jr. | 376/285 |
| 4,032,397 | 6/1977 | Beine et al. | 376/293 |
| 4,259,154 | 3/1981 | Niino et al. | 376/293 |
| 4,289,582 | 9/1981 | Parr et al. | 376/293 |
| 4,581,199 | 4/1986 | Bioset et al. | 376/293 |
| 4,583,584 | 4/1986 | Wepfer | 376/285 |
| 4,596,689 | 6/1986 | Gorholt et al. | 376/285 |

FOREIGN PATENT DOCUMENTS

| | | | |
|---|---|---|---|
| 0101378 | 2/1984 | European Pat. Off. | 376/293 |
| 0151093 | 8/1984 | Japan | 376/285 |
| 1513006 | 6/1978 | United Kingdom | 376/285 |

Primary Examiner—Deborah L. Kyle
Assistant Examiner—Daniel Wasil
Attorney, Agent, or Firm—Robert J. Edwards; D. Neil LaHaye

[57] ABSTRACT

A nuclear component horizontal seismic restraint. Small gaps limit horizontal displacement of components during a seismic occurrence and therefore reduce dynamic loadings on the free lower end. The reactor vessel and reactor guard vessel use thicker section roll-forged rings welded between the vessel straight shell sections and the bottom hemispherical head sections. The inside of the reactor guard vessel ring forging contains local vertical dovetail slots and upper ledge pockets to mount and retain field fitted and installed blocks. As an option, the horizontal displacement of the reactor vessel core support cone can be limited by including shop fitted/installed local blocks in opposing alignment with the reactor vessel forged ring. Beams embedded in the wall of the reactor building protrude into apertures in the thermal insulation shell adjacent the reactor guard vessel ring and have motion limit blocks attached thereto to provide to a predetermined clearance between the blocks and reactor guard vessel ring.

17 Claims, 2 Drawing Sheets

NUCLEAR COMPONENT HORIZONTAL SEISMIC RESTRAINT

BACKGROUND OF THE INVENTION

1. FIELD OF THE INVENTION

This invention relates generally to nuclear reactors and in particular to circumferentially arrayed matching small gap displacements to limit component free end displacement of concentric components.

2. GENERAL BACKGROUND

The nuclear reactor in a nuclear power plant may often be subjected to excessive or unusual shock loadings resulting from seismic disturbances, earth tremors, or structural shocks caused by abrupt changes in temperature or fluid flow. During such times it is desirable to provide nuclear vessel components with seismic restraint at the free end opposite the supported end to prevent large dynamic loadings and resulting stresses in the component and/or vessel contents to prevent damage thereto. A variety of supports are utilized in previous structures.

U.S. Pat. No. 3,850,795 issued to Thome discloses an arrangement wherein a skirt is adjustably clamped and positioned through wedging means which bears against the reactor pressure vessel. Pads are joined to the inside surface of the pressure vessel and screw jacks fitted on the skirt within the pressure vessel engage the pads. The shapes of the pad bearing surfaces allow longitudinal displacement of the reactor structure.

U.S. Pat. No. 3,753,853 issued to Schabert discloses emergency supports between the nuclear container or core and the reactor pressure vessel. Vertical and removable radial support segments become effective only when a rupture of the pressure vessel occurs.

U.S. Pat. No. 3,771,499 issued to Maroni, Jr., et al. discloses a means for laterally supporting a nuclear steam generator against the effect of seismic loadings. Support is provided by means of a stiffening structure incorporating a shock suppressor apparatus which operates through the lever arm of a mechanical linkage.

U.S. Pat. No. 3,720,581 issued to Kaser discloses an inner shell and supporting structure for nuclear reactors of vertical inner shell plates which are not interconnected and horizontal section ribs extending between the plates and the wall of the reactor tank.

U.S. Pat. No. 4,008,757 issued to Weatherford, Jr. discloses a lubricated sliding structure for supporting massive heat exchangers. The lower surface of a forging on the bottom of the pressure vessel has a keyway slot. A support plate with a mating key is received within the slot and bolted to the bottom forging. The lower surface of the support plate has an arcuate surface that presses against a matching lubricating surface to transmit the entire vertical load to a concrete pedestal that has a means for cooling the concrete structure.

U.S. Pat. No. 3,554,868 issued to Thorp discloses a lower radial support system which permits free radial and axial differential expansion. A plurality of plates welded to the bottom of the reactor pressure vessel and a centering sleeve is fitted to the bottom support plate or a reactor core so as to have an interference fit on the inside diameter of the sleeve at operating temperature. The lower end of the sleeve is fitted to that plate structure with a tapered fit to permit vertical differential expansion of the reactor internals.

U.S. Pat. Nos. 3,123,328; 3,192,121; 3,563,855; 3,708,393; and 4,115,194 are representative of a variety of support structures in the art.

It is an object of the present invention to limit the vessel and core support horizontal displacements during a seismic occurrence.

It is another object of the present invention to reduce the accelerations and component dynamic ("G") loadings during a seismic occurrence.

In accordance with the above objects, it is a feature of the present invention to utilize small fixed gaps between local solid blocks.

It is another feature of the present invention to provide the reactor guard vessel and reactor vessel with thicker section roll-forged rings welded between the vessels straight shell sections and the bottom hemispherical head sections.

SUMMARY OF THE INVENTION

According to the invention, circumferentially arrayed local solid blocks are positioned to provide small fixed gaps therebetween. The reactor vessel and reactor guard vessel use thicker section roll forged rings welded between the vessel straight shell and hemispherical head sections. The reactor vessel ring is smooth internally and externally. The reactor guard vessel ring is provided on the internal side with a plurality of dovetail slots and upper ledge pockets for slidably receiving a first block which is bolted to the reactor guard vessel ring to provide a predetermined clearance between the first block and the ring on the reactor vessel. A plurality of beams are embedded in the reactor building wall and extend into corresponding apertures in the thermal insulation shell in alignment with the forged rings and first blocks secured to the reactor guard vessel. A second block is secured at the end of each beam adjacent the ring on the reactor guard vessel to provide a predetermined clearance between the second block and the ring on the reactor guard vessel. The predetermined minimim clearances serve to limit reactor component horizontal movement during a seismic occurrence. A plurality of third blocks may also be attached to the core support cone in alignment with the forged rings and first and second blocks to provide a predetermined clearance between the third blocks and the reactor vessel ring. This additional minimal clearance serves as additional protection against horizontal movement of components during a seismic occurrence while still allowing sufficient vertical flow of fluid.

DESCRIPTION OF THE PREFERRED EMBODIMENT

Figure 1:
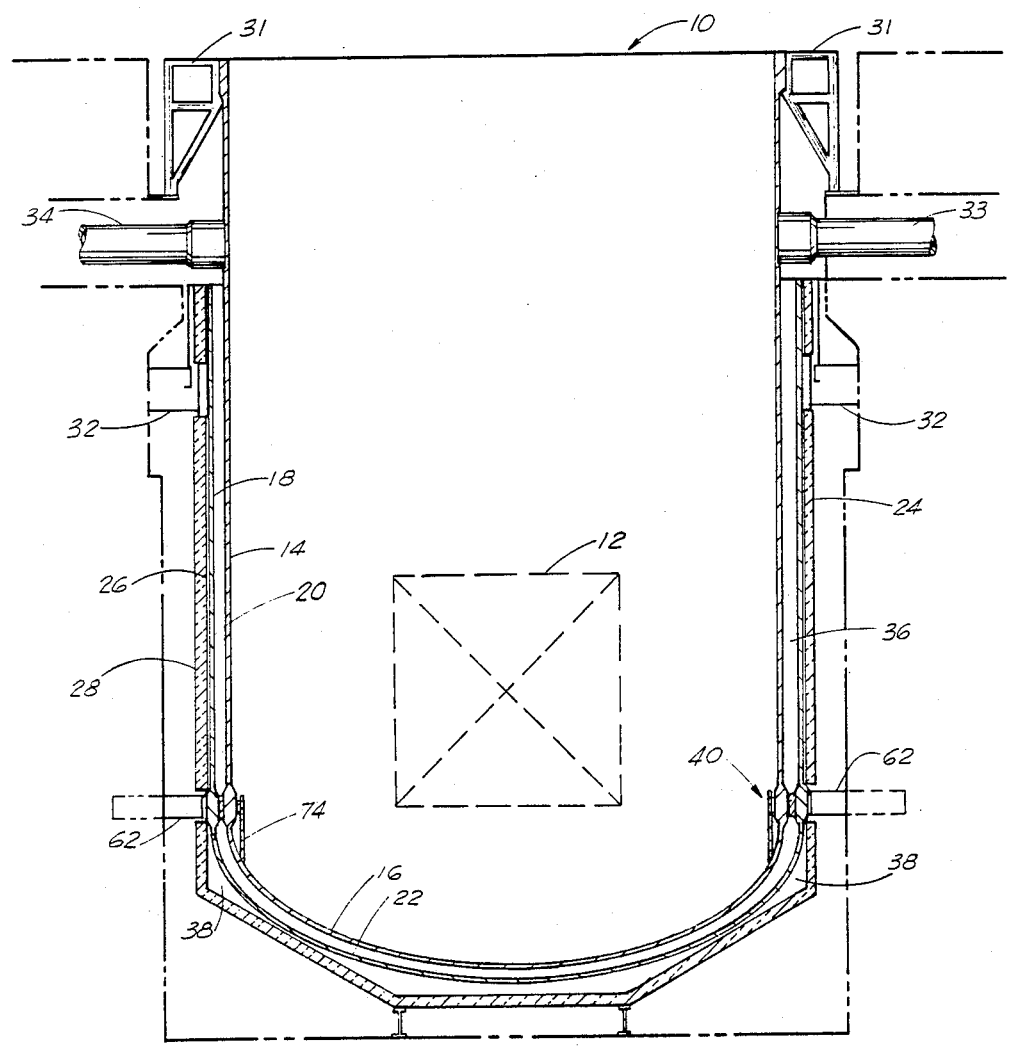
FIG. 1 illustrates a longitudinal section of a typical reactor and the surrounding structure.

Referring now to FIG. 1, the general structure of a reactor and its adjacent supporting structure is illustrated wherein reactor vessel 10 is the principal vessel which surrounds the reactor core 12. The portions of reactor vessel 10 pertinent to the present invention comprise the reactor vessel straight shell section 14 and the reactor vessel bottom hemispherical head 16 which is welded to the straight shell section 14. Reactor vessel 10 is surrounded by reactor guard vessel 18 which is similarly comprised of a straight shell section 20 and a hemispherical head section 22 which are welded together. Surrounding the reactor guard vessel 18 is thermal insulation shell 24 which is formed from inner wall 26 and outer wall 28 and uses any insulation suitable for this application such as metal reflective insulation. Insulation 30 is held between walls 26 and 28. Reactor vessel 10 and reactor guard vessel 18 are supported in their vertical positions by a plurality of support lugs 31 and 32, respectively circumferentially spaced around the exterior of reactor vessel 10 and reactor guard vessel 18. Inlet and outlet nozzles 33 and 34 are provided for coolant flow.

It can be seen in FIG. 1 that annular gaps 36, 38 exist between the reactor vessel 10 and reactor guard vessel 18 and between reactor guard vessel 18 and thermal insulation shell 24 respectively. During a seismic occurrence there is the potential for movement of the above reactor components within annular gaps 36 and 38 in a horizontal plane as support lugs 31 and 32 typically rest on horizontal radial pins not shown which allow reactor vessel 10 to expand and contract without producing high stresses therein and in supporting structures. Horizontal seismic restraints, generally indicated by the numeral 40, are provided to minimize such movement, resulting in reduced dynamic "G" loadings and stresses on the components and contents of reactor vessel 10.

Figure 2:
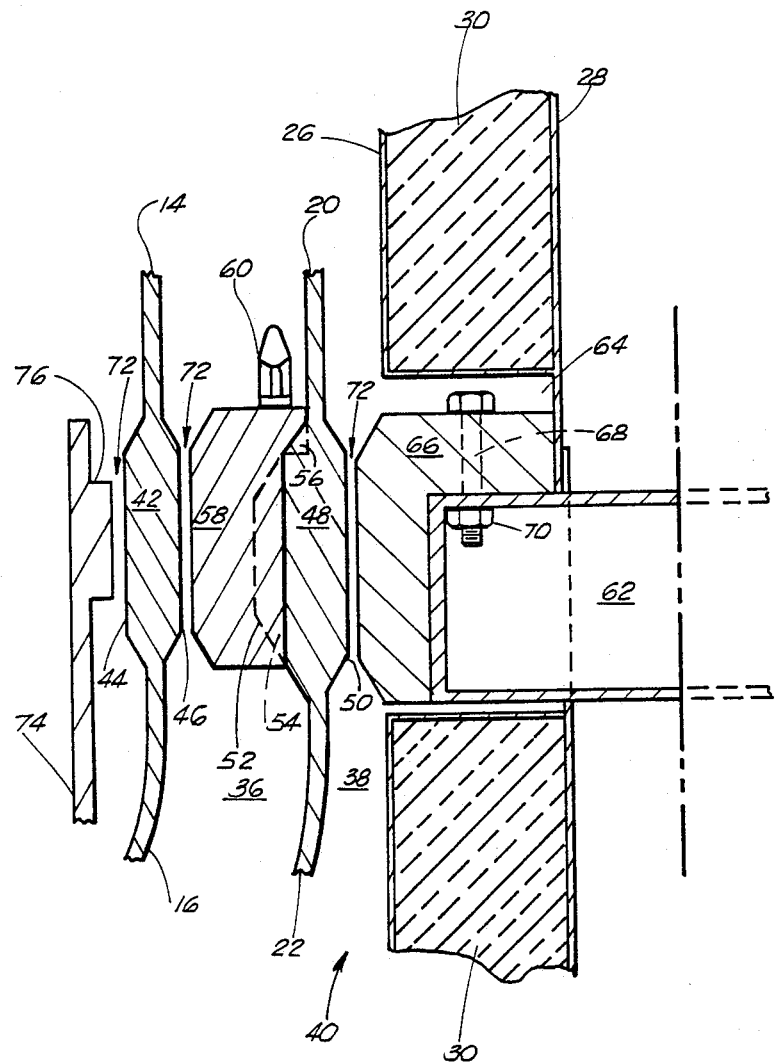
FIG. 2 illustrates an enlarged detailed view of the invention.

FIG. 2 is an enlarged detailed view of horizontal seismic restraints 40 and the surrounding structure. Horizontal seismic restraints 40 are generally comprised of local solid blocks which limit the horizontal displacement of components during a seismic occurrence. In the preferred embodiment restraints 40 are generally comprised of thicker section roll-forged rings on reactor vessel 10 and reactor guard vessel 18 welded between straight shell sections 14, 20 and hemispherical head sections 16, 22.

Forged ring 42 on reactor vessel straight shell section 14 is smooth on internal side 44 and on external side 46. Forged ring 48 on reactor guard vessel straight shell section 20 is provided with a smooth external side 50 and an internal side 52 which contains a plurality of vertical dovetail slots 54 and corresponding upper ledge pockets 56 circumferentially spaced around ring 48. For purposes of illustration only one dovetail slot 54 and corresponding upper ledge pocket 56 are depicted in FIG. 2. Reactor guard vessel limit blocks 58 are machined for sliding engagement with dovetail slots 54 and upper ledge pockets 56. Restraint bolt 60 is threadably engaged through reactor guard vessel limit block 58 and into forged ring 48 as illustrated in phantom view to secure block 58 in position and prevent unwanted movement after it has been installed and reactor operation has commenced.

I-beams 62, preferably 24 wide-flange beams, are installed in the reactor building wall at a height and circumferential spacing around reactor vessel 10 so as to protrude through outer wall 28 of thermal insulation shell 24 in opposed relation to forged ring 48. Spaces 64 are provided in thermal insulation shell 24 to accommodate each of beams 62. Reactor building cavity limit blocks 66 are machined to conform to the shape of beams 62 and protrude into annular space 38 adjacent forged ring 48. Each limit block 66 is secured to its respective beam 62 by bolt 68 threadably engaged through apertures provided in beam 62 and block 66 and secured in position by nut 70.

The present invention presents horizontal seismic restraints 40 which minimize horizontal movement of reactor vessel 10 and its components during a seismic occurrence while still providing a predetermined clearance 72 for thermal expansion during operation. This is accomplished by the use of custom fitted blocks 58, 66. After reactor guard vessel 18 and reactor vessel 10 are aligned and installed in sequence on their respective supports, precise field measurements are taken at each position between forged ring 42 and forged ring 48 and between forged ring 48 and beam 62. The measurements may be taken with the use of remote measuring tools when necessary. Blocks 58 and 66 are then shop fitted and matched to each component with the gap side preferably including adequate extra material to allow field machining at the reactor site to obtain the predetermined clearance 72 as calculated using the measurements. Blocks 58, 66 are generally installed by remotely operated tools where necessary. In the preferred embodiment 24 sets of blocks 58, 66 and beams 62 are utilized around the reactor.

An alternate embodiment of the invention is provided and illustrated as part of FIG. 2 wherein horizontal displacement of core support cone 74 may be limited by including shop fitted and installed blocks 76 welded on the outside wall thereof in opposed relationship to internal side 44 of forged ring 42. A minimal clearance 72 or hot gap is calculated by measurements as indicated above. Core support cone blocks 76 may be used without impeding vertical fluid flow. Also, where the reactor guard vessel and its limit blocks are eliminated, the remainder of restraints 40 are equally applicable as a lower seismic restraint to top supported pressurized and boiling water reactor vessels.

Although beam 62 is indicated in the description of the preferred embodiment as a wide flange beam it should be understood that other suitable structures such as a rolled structural ring embedded in the wall of the reactor building may also be used. It should be noted that forged rings 42, 48 and blocks 58, 66 are provided with tapered upper and lower edges which face the annular gaps between core support cone 74, reactor vessel 10, reactor guard vessel 18 and thermal insulation shell 24 to provide for ease of fabrication and installation.

Although a specific embodiment of the invention has been set forth above, it should be understood that the description is intended to be illustrative and should not be interpreted in a limited sense as various modifications of the invention obvious to those skilled in the art may be practiced.

What is claimed is:

1. In a nuclear reactor having a reactor vessel, a reactor guard vessel, a thermal insulation shell and a horizontal seismic restraint, said restraint comprising:
    a. a first ring on the wall of said reactor vessel;
    b. a second ring on the wall of said reactor guard vessel in alignment with said first ring;
    c. a first block attached to said second ring proximate said first ring so as to provide a predetermined clearance between said first block and said first ring which is reduced to zero during thermal expansion;
    d. motion limit means extending through an aperture in said thermal insulation shell in alignment with said second ring and said first block; and
    e. a second block attached to said motion limit means proximate said second ring and in alignment with said first block so as to provide a predetermined clearance between said second block and said second ring which is reduced to zero during thermal expansion.

2. The device of claim 1 wherein said first and second rings are roll forged rings welded to said reactor vessel and said reactor guard vessel.

3. The device of claim 2 wherein said first and second rings are welded to said reactor vessel and said reactor guard vessel adjacent the junction of the straight shell and hemispherical head sections of said vessels.

4. The device of claim 1 wherein said second ring is provided with a dovetail slot and upper ledge pocket for slidably receiving said first block.

5. The device of claim 4 wherein said first block is bolted to said second ring.

6. The device of claim 1, further comprising a third block attached to the core support cone proximate said first ring.

7. The device of claim 1 wherein said motion limit means comprises a rolled structural ring.

8. The device of claim 1 wherein said motion limit means comprises a wide flange beam.

9. In a nuclear reactor having a reactor vessel, a reactor guard vessel, a thermal insulation shell and a horizontal seismic restraint, said restraint comprising:
   a. a first roll forged ring welded on the wall of said reactor vessel adjacent the junction of the straight shell and hemispherical head sections;
   b. a second roll forged ring welded on the wall of said reactor guard vessel adjacent the junction of the straight shell and hemispherical head sections and in alignment with said first ring;
   c. a plurality of first blocks attached to and circumferentially spaced around said second ring proximate said first ring so as to provide a predetermined clearance between said first blocks and said first ring which is reduced to zero during thermal expansion;
   d. motion limit means extending through an aperture in said thermal insulation shell in alignment with said second ring and said first blocks; and
   e. a plurality of second blocks attached to said motion limit means proximate said second ring and in alignment with said first blocks so as to provide a predetermined clearance between said second blocks and said second ring which is reduced to zero during thermal expansion.

10. The device of claim 1 wherein said second ring is provided with a plurality of dovetail slots and corresponding upper ledge pockets circumferentially spaced around said second ring for slidably receiving said first blocks.

11. The device of claim 10 wherein said first blocks are bolted to said second ring.

12. The device of claim 9, further comprising a plurality of third blocks attached to and circumferentially spaced around the core support core proximate said first ring so as to provide a predetermined clearance between said third blocks and said reactor vessel.

13. The device of claim 9 wherein said motion limit means comprises a rolled structural ring.

14. The device of claim 9 wherein said motion limit means comprises a wide flange beam.

15. In a nuclear reactor having a reactor vessel, a reactor guard vessel, a thermal insulation shell and a horizontal seismic restraint, said restraint comprising:
   a. a first roll forged ring welded on the wall of said reactor vessel adjacent the junction of the straight shell and hemispherical head sections;
   b. a second roll forged ring welded on the wall of said reactor guard vessel adjacent the junction of the straight shell and hemispherical head sections in alignment with said first ring and having 24 circumferentially spaced vertical dovetail slots and corresponding upper ledge pockets;
   c. a first block slidably engaged in each of said slots and pockets and bolted to said second ring so as to provide a predetermined clearance for thermal expansion between said first block and said first ring;
   d. a plurality of beams extending through apertures in said thermal insulation shell in alignment with said second ring and said first blocks thereon; and
   e. a second block attached to the end of each of said beams adjacent said second ring so as to provide a predetermined clearance for thermal expansion between said second blocks and said second ring.

16. The device of claim 15, further comprising a plurality of third blocks attached to and circumferentially spaced around the core support cone proximate said first ring so as to provide a predetermined clearance for thermal expansion between said third blocks and said reactor vessel.

17. The device of claim 15 wherein said beams comprise wide flange beams.

* * * * *